US012627510B2

(12) United States Patent
Gupta et al.

(10) Patent No.: US 12,627,510 B2
(45) Date of Patent: May 12, 2026

(54) ENCODING AN AUTHENTICATION COOKIE WITH METADATA

(71) Applicant: Juniper Networks, Inc., Sunnyvale, CA (US)

(72) Inventors: Peyush Gupta, Cupertino, CA (US); Raqib Hesaam Jones, San Jose, CA (US); Umesh Mangla, Sunnyvale, CA (US); Dilip H. Sanghavi, San Ramon, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 166 days.

(21) Appl. No.: 18/397,291

(22) Filed: Dec. 27, 2023

(65) Prior Publication Data

US 2025/0219849 A1 Jul. 3, 2025

(51) Int. Cl.
*H04L 9/32* (2006.01)

(52) U.S. Cl.
CPC .................................. *H04L 9/3268* (2013.01)

(58) Field of Classification Search
CPC .................................................... H04L 9/3268
See application file for complete search history.

(56) References Cited

U.S. PATENT DOCUMENTS

| | | | | |
|---|---|---|---|---|
| 6,374,359 B1 * | 4/2002 | Shrader | .................. | H04L 67/14 |
| | | | | 726/19 |
| 2010/0017596 A1 * | 1/2010 | Schertzinger | ......... | H04L 63/062 |
| | | | | 713/155 |
| 2012/0110326 A1 * | 5/2012 | Rossi | .................. | H04W 12/062 |
| | | | | 713/162 |
| 2021/0083882 A1 * | 3/2021 | Venable, Sr. | ......... | H04L 9/3268 |

* cited by examiner

*Primary Examiner* — Hany S. Gadalla
(74) *Attorney, Agent, or Firm* — Harrity & Harrity, LLP

(57) ABSTRACT

In some implementations, an authenticator device may receive, from a browser, a request to connect to a secure service, wherein the request includes login credentials associated with a user of the browser. The authenticator device may determine that the user is an authorized user to access the secure service based on the login credentials. The authenticator device may generate an authentication cookie for the browser, wherein the authentication cookie encodes metadata information associated with the user, and wherein the metadata information includes at least an indication of user attributes of the user. The authenticator device may transmit, to the browser device, the authentication cookie.

20 Claims, 11 Drawing Sheets

600

610 — Receive, from a browser, a request to connect to an authenticated session with a secure service, wherein the request includes login credentials associated with a user of the browser 620 — Determine that the user is an authorized user to access the secure service based on the login credentials 630 — Generate an authentication cookie for the browser, wherein the authentication cookie encodes metadata information associated with user, and wherein the metadata information includes at least an indication of user attributes of the user 640 — Transmit, to the browser, the authentication cookie

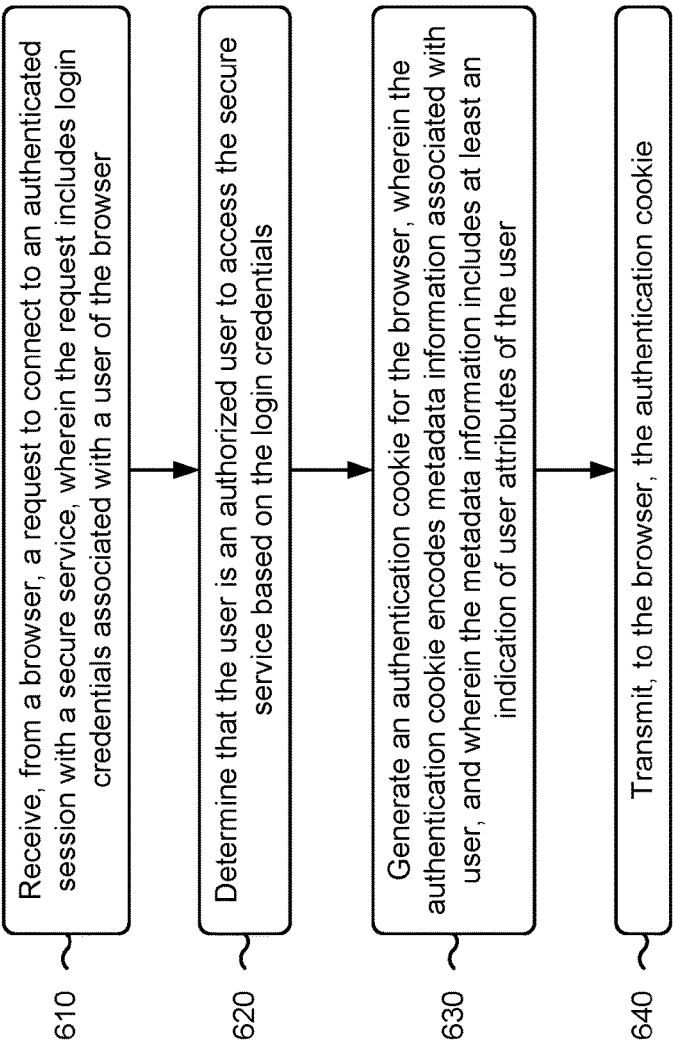

Receive, from a browser, a request to connect to an authenticated session with a secure service, wherein the request includes login credentials associated with a user of the browser

610

Determine that the user is an authorized user to access the secure service based on the login credentials

620

Generate an authentication cookie for the browser, wherein the authentication cookie encodes metadata information associated with user, and wherein the metadata information includes at least an indication of user attributes of the user

630

Transmit, to the browser, the authentication cookie

ENCODING AN AUTHENTICATION COOKIE WITH METADATA

BACKGROUND

In cloud-based services, ensuring robust and efficient user authentication remains a critical challenge. Certain authentication schemes rely on direct input from a user, such as input of a username and a password, which may be susceptible to security breaches and/or which may result in a poor user experience. In some examples, to offer a more streamlined user experience, a user may be provided with an authentication cookie after providing login credentials. The authentication cookie is a small piece of data sent from a server and stored within the user's browser. The authentication cookie may include information that verifies the user's identity and thus negates the need for repeated credential entries during an authenticated session and/or in subsequent sessions. In some examples, an authentication cookie may serve as a secure token, which the cloud-based service validates to grant access, thereby enhancing security and user experience.

SUMMARY

Some implementations described herein relate to a method. The method may include receiving, at an authenticator device and from a browser, a request to connect to a secure service, wherein the request includes login credentials associated with a user of the browser. The method may include determining, by the authenticator device, that the user is an authorized user to access the secure service based on the login credentials. The method may include generating, by the authenticator device, an authentication cookie for the browser, wherein the authentication cookie encodes metadata information associated with the user, and wherein the metadata information includes at least an indication of user attributes of the user. The method may include transmitting, by the authenticator device and to the browser, the authentication cookie.

Some implementations described herein relate to a method. The method may include receiving, at an authenticator device and from a browser device, a request to access a secure service, wherein the request is marked with an authentication cookie issued by another authenticator device, wherein the authentication cookie includes metadata information associated with a user of the browser, and wherein the metadata information includes at least an indication of user attributes of the user. The method may include determining, by the authenticator device, that the user is an authorized user to access the secure service based on the user attributes. The method may include responding, by the authenticator device, to the request based on determining that the user is the authorized user.

Some implementations described herein relate to a system. The system may include a secure service controller device and multiple authenticator devices in communication with the secure service controller device, with each of the multiple authenticator devices being associated with a corresponding point of presence. A first authenticator device, of the multiple authenticator devices, may be configured to receive, from a browser, a connection request to connect to a secure service, wherein the connection request includes login credentials associated with a user of the browser. The first authenticator device may be configured to determine that the user is an authorized user to connect to the secure service based on the login credentials. The first authenticator device may be configured to generate an authentication cookie for the browser, wherein the authentication cookie encodes metadata information associated with the user, and wherein the metadata information includes at least an indication of user attributes of the user. The first authenticator device may be configured to transmit, to the browser device, the authentication cookie. The second authenticator device, of the multiple authenticator devices, may be configured to receive, from the browser device, an access request to access the secure service, wherein the access request is marked with the authentication cookie. The second authenticator device may be configured to determine that the user is an authorized user to access the secure service based on the user attributes. The second authenticator device may be configured to respond to the access request based on determining that the user is the authorized user to access the secure service.

BRIEF DESCRIPTION OF THE DRAWINGS

FIG. 6 is a flowchart of an example process associated with encoding an authentication cookie with metadata.

DETAILED DESCRIPTION

Figure 1A:
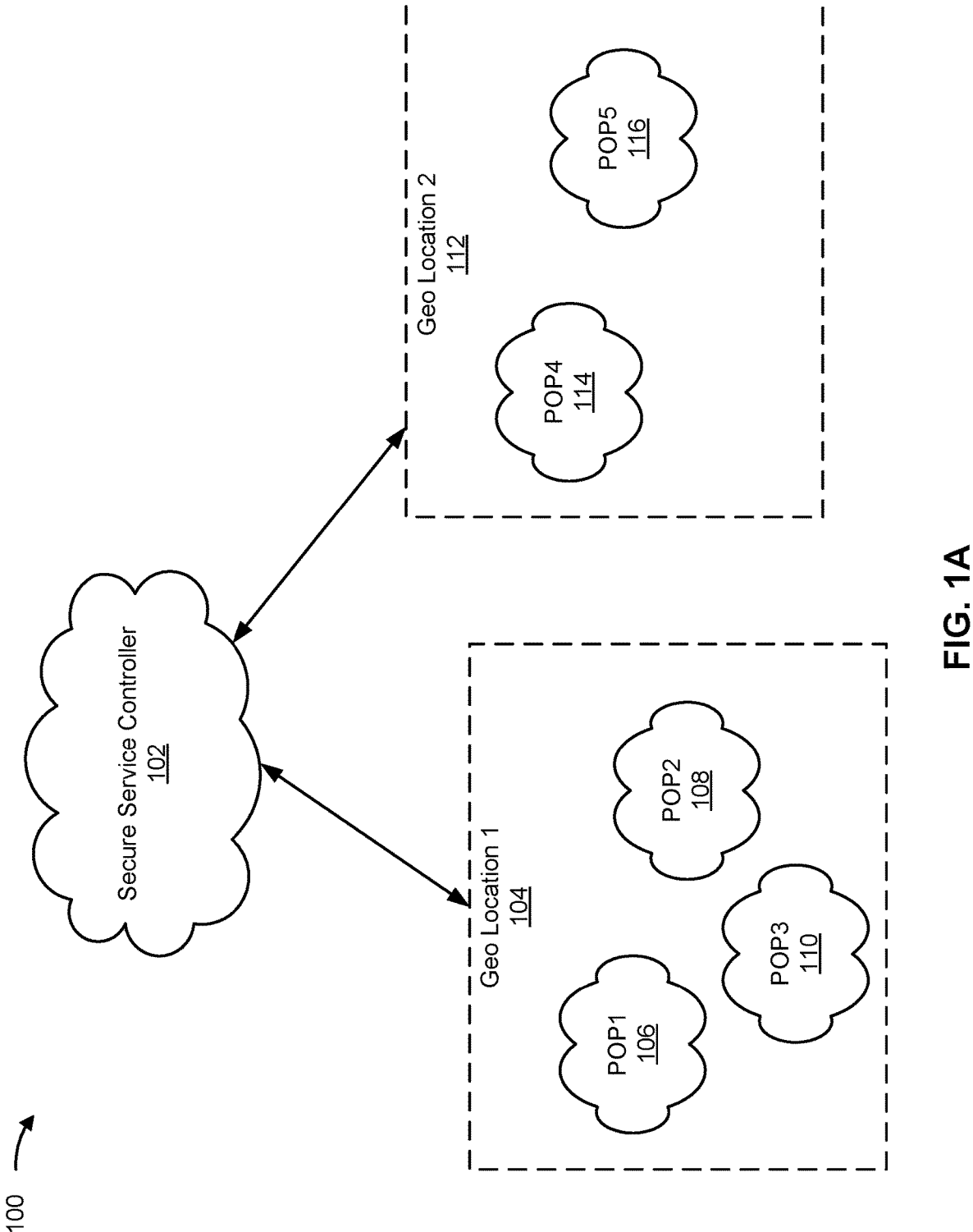
FIGS. 1A-1C are diagrams of an examples associated with authenticating a user at multiple points of presence.

The following detailed description of example implementations refers to the accompanying drawings. The same reference numbers in different drawings may identify the same or similar elements.

An organization may utilize cloud-based security products and solutions (sometimes referred to herein as a cloud-based secure service, or simply a secure service), such as for purposes of identifying authorized users of systems associated with the organization or securing information exchange between a browser and a server associated with the organization, among other purposes. For example, a secure service may enable integration of security devices, such as by deploying firewalls, intrusion detection and prevention systems, and/or other security applications to a network. Additionally, or alternatively, a secure service may provide cloud security solutions, such as by deploying features and/or products designed to protect cloud-based resources and data. In some examples, a secure service may provide network-edge security (e.g., security to a point in a network where an enterprise network connects to an outside network), such as by deploying security measures at edge locations to protect against threats and manage traffic effectively. Additionally, or alternatively, a secure service may provide network policy and access control functionality, such as by implementing policies for network access, user authentication, and/or user authorization to ensure that only authorized users can access network resources. In some other examples, a secure service may provide software-defined networking (SDN) security, such as by employing an SDN architecture. Additionally, or alternatively, a secure service may provide compliance and reporting services, ensuring compliance with various regulatory standards and/or providing detailed security reporting and/or analysis.

In some examples, a user (sometimes referred to herein as a roaming user) may access a secure service via multiple physical locations and/or via multiple points of presence (POPs) associated with a network. A POP may refer to a physical location that houses networking equipment, such as networking equipment that connects users to a cloud service provider's network. In some examples, POPs may be strategically placed to be as close as possible to users, such as for purposes of reducing latency, improving speed, and/or ensuring reliability to the cloud-based services, among other purposes. A POP may include servers, routers, switches, and/or other networking equipment that manage network traffic between end-users and cloud services. Additionally, or alternatively, a POP may include a firewall, intrusion detection systems, and/or other security applications. Each POP associated with a network may communicate with a central controller (sometimes referred to herein as a secure service controller device) and/or a central cloud infrastructure, which may involve data transfer, security services processing, network traffic managements, and/or other cloud computing services.

In some examples, the secure service may be configured to authenticate the roaming user at each POP and/or issue an authentication cookie to the roaming user (e.g., to the roaming user's browser) at each POP, such as by requiring the roaming user to enter login credentials at each POP. More particularly, as the roaming user moves from a first POP (sometimes referred to herein as a home POP) to a second POP (sometimes referred to herein as a remote POP), an authentication cookie associated with the roaming user (e.g., an authentication cookie set in the roaming user's browser) may require synchronization from the home POP to the remote POP. This synchronization may add extra overhead in the network, increase latency associated with network operations, and/or may result in a diminished user experience as the roaming user is repeatedly required to provide login credentials or otherwise establish an authenticated session. For example, a roaming user may latch onto a remote POP because metrics associated with a service level agreement (SLA) are better for the remote POP than for the home POP due to transient networking conditions or otherwise, which may lead to repeated reauthentication of roaming user in the remote POP and/or the home POP as the user ping pongs across POPs.

Some implementations described herein enable encoding of metadata into an authentication cookie, such as for purpose of providing user attributes (e.g., a username, a user's role, one or more groups associated with a user, and/or similar information) to a remote POP without requiring a user to reenter login credentials at the remote POP or otherwise reestablish an authenticated session with the remote POP. In some implementations, when establishing an authenticated session with a browser, an authenticator device at a first POP (e.g., a home POP) may provide the browser with an authentication cookie encoded with metadata, such as user attributes (e.g., username, a user's role within an organization, groups associated with the user, and/or similar attributes). Moreover, the authenticator device at the first POP may encrypt the authentication cookie (and thus the metadata encoded therein) using a symmetric key, may sign the authentication with a private key (e.g., a private key issued by a root certificate authority (CA)), and/or may store the authentication key within the user's browser. In this way, if the user connects to a second POP (e.g., a remote POP), the browser user may be redirected to an authenticator device at the remote POP (e.g., as part of an authorization workflow), which may de-sign the authentication cookie, decrypt the authentication cookie, decode the authentication cookie, and extra the metadata (e.g., user attributes) from the authentication cookie. As a result, the authenticator device at the remote POP may be provided with information needed to establish an authenticated session (e.g., user attributes) without requiring a user to re-enter login information and/or manually establish an authenticated session, thereby reducing network overhead, decreasing network latency, providing an improved user experience, and/or reducing power, computing, and network resource consumption otherwise associated to reauthentication of a roaming user at remote POPs.

Figure 1B:
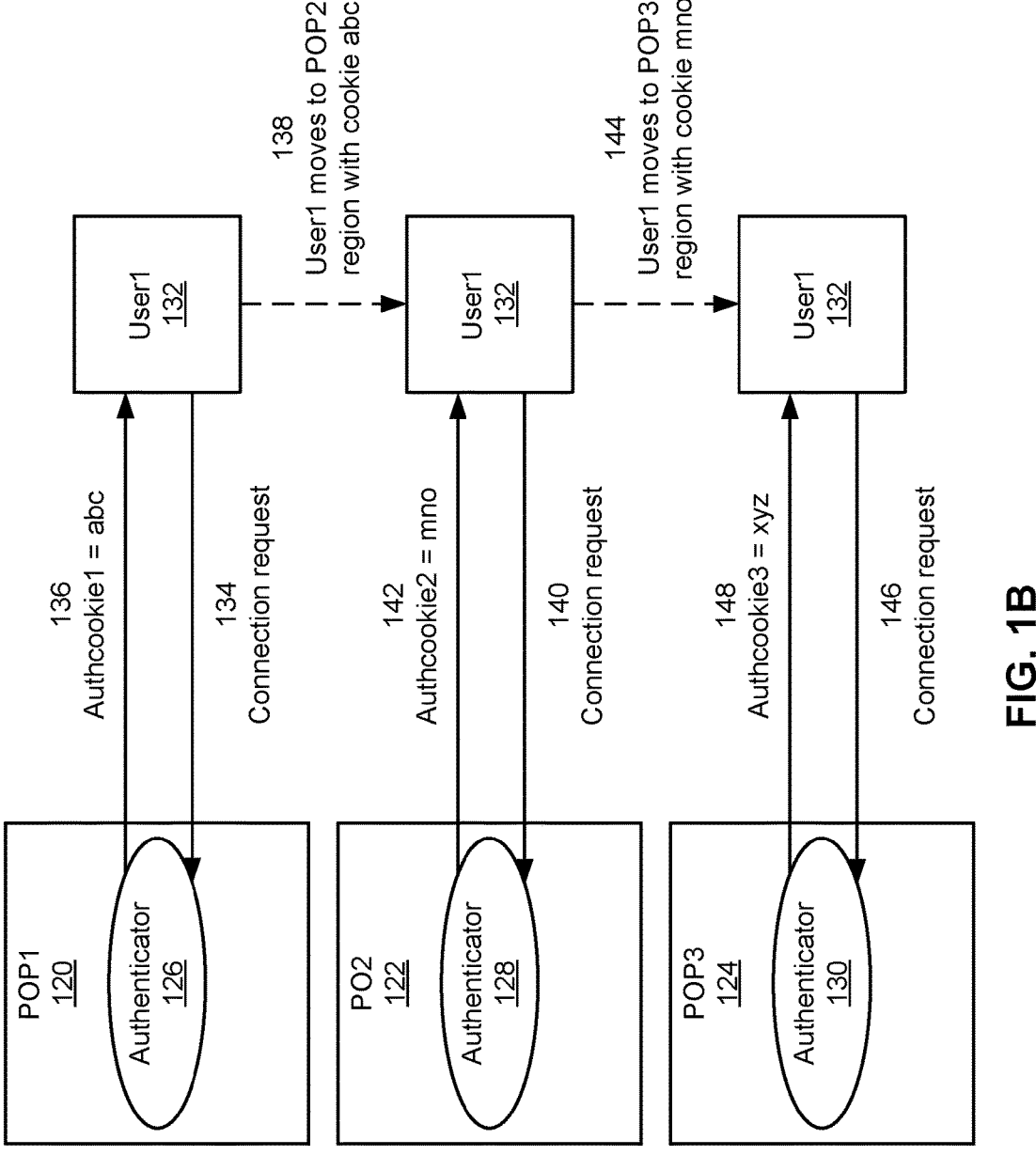
Figure 1C:
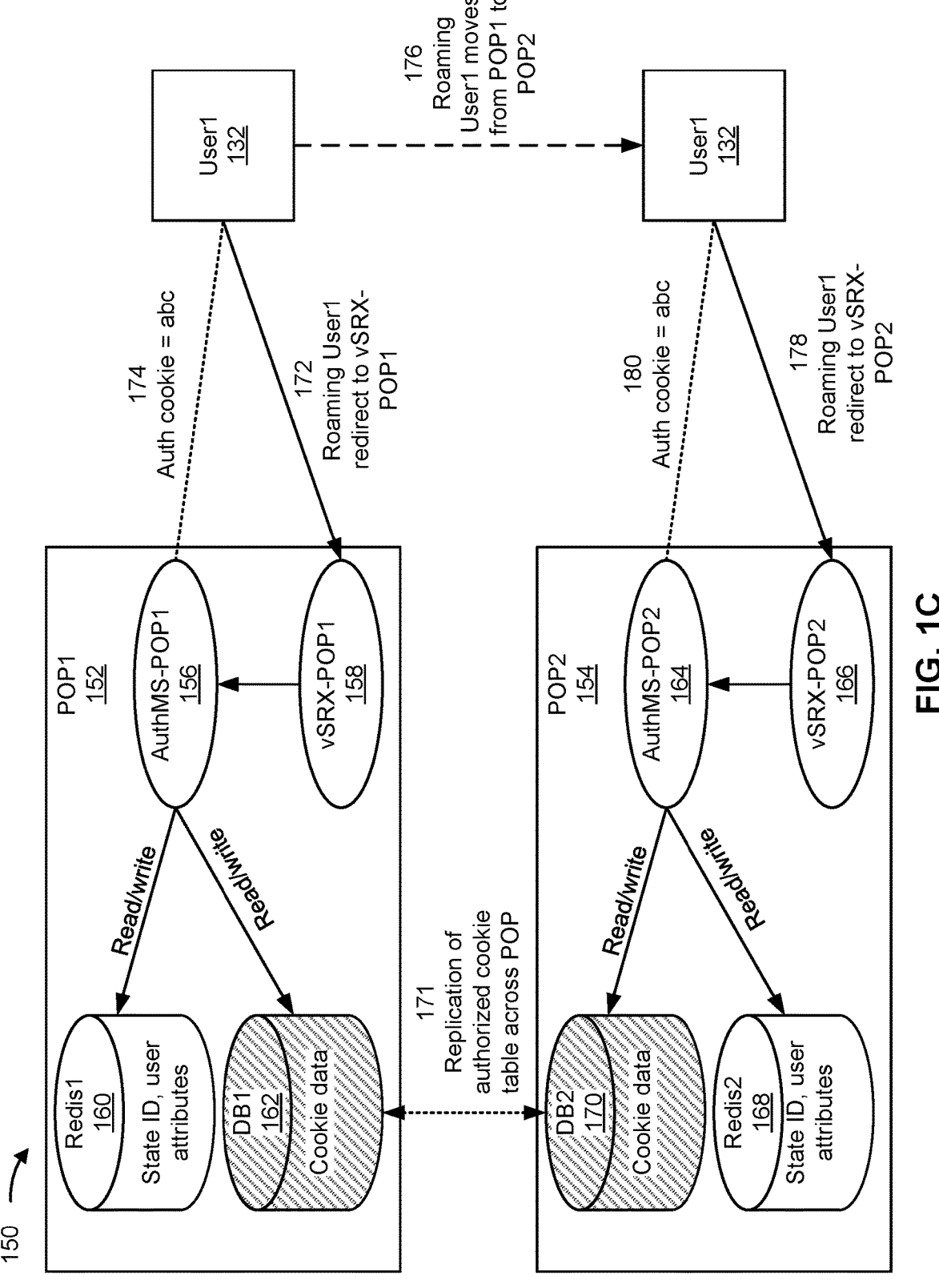

FIGS. 1A-1C are diagrams of an examples associated with authenticating a user at multiple POPs.

As shown in FIG. 1A, and as indicated by reference number 100, a secure service may be deployed via a centralized and/or cloud-based secure service controller device 102 and one or more POP devices. In some examples, a POP device may be physically located near to other POP devices and may be relatively distant from some other POP devices. For example, in the example shown in FIG. 1A, a first geographic location 104 (shown as "Geo location 1") may be associated with a first POP device 106 (shown as "POP1"), a second POP device 108 (shown as "POP2"), and a third POP device 110 (shown as "POP3"). Moreover, a second geographic location 112 (shown as "Geo location 2") may be associated with a fourth POP device 114 (shown as "POP4") and a fifth POP device 116 (shown as "POP5"). A user may access the secure service controller device 102 and/or a cloud-based service provided by the secure service controller device 102 by establishing an authenticated session with one of the POP devices 106, 108, 110, 114, 116, which is described in more detail below in connection with FIGS. 1B and 1C.

In some examples, based on SLA criteria associated with a POP device or similar criteria, a user accessing a secure service may ping-pong between multiple POP devices provided at a single geographic location (e.g., the user may switch back and forth between POP devices at a geographic location for a purpose of establishing a connection to the secure service). For example, a user may initially access a secure service via the first POP device 106, such as by transmitting login credentials (e.g., a username and/or password) via the user's browser to the first POP device 106. If authorized to access the secure service, the first POP device 106 may store an authentication cookie at the user's browser, such that the user may append the authenticated cookie to subsequent requests, indicating that the user is authorized to receive the secure service. Later, the user may be redirected to a different POP device, such as the second POP device 108, such as in a case where the second POP device 108 becomes a more suitable POP device for accessing the secure service. In that regard, the authentication cookie issued by the first POP device 106 may no longer provide a valid authorization for the user to access the secure service, because the second POP device 108 may have no record of the authentication cookies issued by the first POP device 106. Accordingly, the user may be prompted to reenter login credentials and/or otherwise reestablish an authenticated session with the secure service.

In some other examples, a user accessing a secure service may physically move and thus may need to access the secure service via a new POP device. For example, a user may initially be located in the first geographic location 104, and thus may access the secure service via a POP device associated with the first geographic location 104, such as the third POP device 110. If the user is authorized to access the secure service, the third POP device 110 may store an authentication cookie at the user's browser, such that the browser may append the authenticated cookie to subsequent requests, indicating that the user is authorized to receive the secure service. Later, if the user travels to a different geographic location, such as the second geographic location 112, the user may access the secure service via a POP device associated with the second geographic location 112, such as the fourth POP device 114. In that regard, the authentication cookie issued by the third POP device 110 may no longer provide a valid authorization for the user to access the secure service, because the fourth POP device 114 may have no record of the authentication cookies issued by the third POP device 110. Accordingly, the user may be prompted to reenter login credentials and/or otherwise reestablish an authenticated session with the secure service, leading to increased latency, high network overhead, and a diminished user experience.

This may be more readily understood with reference to FIGS. 1B and 1C, which depict two examples in which a roaming user moves from one POP to another POP, requiring synchronization of an authentication cookie set in the roaming user's browser. This may add overhead and latency in the network. Moreover, synchronization of information across multiple geographic regions (e.g., the first geographic location 104 and the second geographic location 112 described above in connection with FIG. 1A) may require compliance with certain general data protection regulation (GDPR) requirements and/or may require investment in infrastructure that permits migration of data from one geographic region to another with optimal latency, which is described in more detail below.

As shown in FIG. 1B, and as indicated by reference number 118, in some examples a roaming user may be required to re-establish an authenticated session at each POP, with the roaming user thus receiving a new authentication cookie at each POP. More particularly, the example depicted by reference number 118 may include three POP devices, including a first POP device 120, a second POP device 122, and a third POP device 124. Each POP device may in turn be associated with an authentication component (sometimes referred to herein as an authentication microservice and/or an authenticator device). More particularly, the first POP device 120 may be associated with a first authenticator device 126, the second POP device 122 may be associated with a second authenticator device 128, and the third POP device 124 may be associated with a third authenticator device 130. A roaming user 132 (shown in FIG. 1B as "User1") may establish connections with each POP device (e.g., via the roaming user 132's browser), such as in response to SLA criteria becoming better for a remote POP than a home POP and/or in response to the roaming user 132 moving geographic locations, as described above in connection with FIG. 1A. In that regard, the roaming user 132 may, in turn, provide login credentials or similar information to each POP device and/or may establish an authenticated session with each POP device.

More particularly, as indicated by reference number 134, the roaming user 132 may transmit (e.g., via a browser) a connection request to the first POP device 120, which may include information to be used to authenticate the roaming user 132 as an authorized user of the secure service, such as login credentials (e.g., a username and/or a password). The first authenticator device 126 may authenticate the roaming user 132 as an authorized user of a secure service (e.g., by comparing the login credentials to a database of authorized users, or the like), and, if the roaming user 132 is authenticated, the first authenticator device 126 may issue the roaming user 132 a first authentication cookie (e.g., may store an authentication cookie (shown as "Authcookie1") in the roaming user 132's browser), as indicated by reference number 136. In some examples, the first authentication cookie may be associated with a first set of data, such as data "abc" as shown in FIG. 1B.

As indicated by reference number 138, the roaming user 132 may thereafter switch POPs with the first authentication cookie stored in the roaming user 132's browser. For example, the roaming user 132 may move to a region including the second POP device 122 with the authentication cookie that includes the data "abc." In that regard, when the roaming user 132 attempts to access the secure service via the browser, the second POP device 122 may not recognize the authentication cookie, and the roaming user 132 may thus be redirected to an authorization workflow in order to reauthenticate the roaming user 132 and/or receive an updated authentication cookie, in a similar manner as described above in connection with the first POP device 120. More particularly, as indicated by reference number 140, the roaming user 132 may transmit a connection request to the second POP device 122, which may include login credentials and/or other information. The second authenticator device 128 may authenticate the roaming user 132 as an authorized user of a secure service, and the second authenticator device 128 may issue the roaming user 132 a second authentication cookie (shown as "Authcookie2"), as indicated by reference number 142. In some examples, the second authentication cookie may be associated with a second set of data different from the first set of data (e.g., abc). For example, as shown in FIG. 1B, the second authentication cookie may be associated with data "mno."

This reauthentication procedure may need to be repeated each time the roaming user 132 switches POPs, such as if the roaming user 132 returns to a home POP (e.g., the first POP device 120) and/or moves to a different remote POP. For example, the roaming user 132 may thereafter move to a region including the third POP device 124 with an authentication cookie that includes the data "mno." In that regard, when the roaming user 132 attempts to access the secure service, the third POP device 124 may not recognize the authentication cookie, and the roaming user 132's browser may thus be redirected to an authorization workflow in order to reauthenticate the roaming user 132 and/or receive an updated authentication cookie, in a similar manner as described above in connection with the first and second POP devices 120, 122. More particularly, as indicated by reference number 146, the roaming user 132 may transmit a connection request to the third POP device 124, which may include login credentials and/or other information. The third authenticator device 130 may authenticate the roaming user 132 as an authorized user of a secure service, and the third authenticator device 130 may thus issue the roaming user 132 a third authentication cookie (shown as "Authcookie3"), as indicated by reference number 148. In some examples, the third authentication cookie may be associated with a third set of data different from the first set of data (e.g., abc) and/or the second set of data (e.g., mno). For example, as shown in FIG. 1B, the third authentication cookie may be associated with data "xyz." The reauthentication procedure may generally be repeated in a like manner for each subsequent POP switch, resulting in high network overhead and high latency.

In some other examples, data may be shared between multiple POPs, such as for a purpose of permitting an authentication cookie issued by a first POP to be used to authenticate a user at a second POP. For example, as shown in FIG. 1C, and as indicated by reference number 150, an authentication cookie database may be replicated across multiple POPs in order for a roaming user to reuse an authentication cookie issued by a home POP at a remote POP. More particularly, the example shown in connection with reference number 150 includes a first POP device 152 and a second POP device 154. Each POP device 152, 154 may be associated with one or more microservices and/or databases. For example, the first POP device 152 is associated with a first authentication microservice device 156 (shown as "AuthMS-POP1"), a first virtual firewall device 158 (e.g., a virtual SRX (vSRX) series services gateway device, shown as "vSRX-POP1"), a first remote dictionary service (redis) 160 (shown as "Redis1"), and/or a first authentication cookie database 162 (shown as "DB1"). Similarly, the second POP device 154 is associated with a second authentication microservice device 164 (shown as "AuthMS-POP2"), a second virtual firewall device 166 (shown as "vSRX-POP2"), a second redis 168 (shown as "Redis2"), and/or a second authentication cookie database 170 (shown as "DB2"). In such examples, and as shown by reference number 171, the content of the authentication cookie databases 162, 170 (e.g., an authentication cookie table) may be replicated across POPs, such that each POP may recognize authentication cookies issued by other POPs.

More particularly, as indicated by reference number 172, when the roaming user 132 attempts a connection to a secure service via the first POP device 152 via the roaming user 132's browser, the browser may be redirected to the first virtual firewall device 158, such as via a browser proxy auto configuration (PAC) file. The roaming user 132 may be prompted to enter login credentials, such as a username and/or password. Using the login credentials, the first authentication microservice device 156 may determine whether the roaming user 132 is an authorized user of the secure service, such as by referencing the first redis 160. The first redis 160 may locally store (e.g., at the first POP device 152) frequently accessed data, such as state identifiers (IDs), user attributes, or similar information. If the user is identified as an authorized user, the first authentication microservice device 156 may issue the roaming user 132 an authentication cookie (e.g., may store an authentication cookie in the user's browser), such as an authentication cookie including data "abc," as indicated by reference number 174. The first authentication microservice device 156 may also store the authentication cookie (e.g., abc) in the first authentication cookie database 162. As described above in connection with reference number 171, this data may periodically be replicated across POPs, such that the authentication cookie may also be listed in the second authentication cookie database 170.

As indicated by reference number 176, the roaming user 132 may thereafter move from the first POP device 152 to the second POP device 154. Accordingly, as indicated by reference number 178, the roaming user 132's browser may be redirected to the second virtual firewall device 166, such as via a browser PAC file. In this example, a connection request sent by the roaming user 132 to the second POP device 154 (more particularly, to the second virtual firewall device 166) may include the authentication cookie abc. The second authentication microservice device 164 may determine whether the roaming user 132 is an authorized user of the secure service, such as by referencing second authentication cookie database 170. If the user is identified as an authorized user (e.g., if the authentication cookie abc is provided in the authenticated cookie table in the second authentication cookie database 170), the second authentication microservice device 164 may authorize access to the secure service using the previously issued authentication cookie (e.g., abc), as indicated by reference number 180. In this way, the roaming user may not be required to reenter login credentials at a remote POP, which may improve a user experience as compared to the example described above in connection with FIG. 1B. However, this example may result in high network overhead, because the authenticated cookie table may need to be frequently replicated across the various POPs associated with a secure service.

As indicated above, FIGS. 1A-1C are provided as examples. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

FIGS. 2A-2D are diagrams of an examples associated with encoding an authentication cookie with metadata. As shown in FIGS. 2A-2D, the examples include POP devices 202, 204, 206, 264, 266; authenticator devices 208, 210, 212; a browser 214 associated with a roaming user (shown in FIGS. 2A-2D as "User1"); a global root CA device 238; intermediate CA devices 240, 242, 244; authentication microservice devices 268, 278; virtual firewall devices 270, 280; adaptor microservice devices 274, 284; and/or an identity provider (IDP) device 276. These devices are described in more detail below in connection with FIG. 3-5.

In some implementations, in order to improve user experience associated with connecting to a secure service, reduce latency and/or network overhead associated with authenticating a user of a secure service, and/or otherwise improve network operations associated with authenticating a user of a secure service, a network device (e.g., a POP device and/or an authenticator device) may encode metadata into an authentication cookie, such as by encoding user attributes into the authentication cookie, among other examples. In such implementations, when the authentication cookie is presented at a remote POP device, the remote POP device and/or an authenticator device associated with the remote POP device may extract the metadata (e.g., user attributes such as username, a user's role within an organization, one or more groups associated with the user, and/or similar information) from the authentication cookie and thus authenticate the user without requiring the user to reenter login credentials and/or without requiring resource-intensive replication of an authentication cookie tables across multiple POPs in a network. In some implementations, a first POP (e.g., a home POP) may encode an authentication cookie with the metadata (e.g., user attributes, a username, a user's role, authorized groups associated with the user, and/or similar metadata), may encrypt the encoded the authentication cookie using a symmetric key, and/or may sign the authentication cookie with a private key of a certificate issued by a root CA, or a similar entity. A second POP (e.g., a remote POP) may in turn validate the roaming user by de-signing the cookie using the private key, decrypting the cookie using the symmetric key, decoding the cookie to extract the metadata (e.g., the user attributes), and identifying whether the roaming user is an authorized user of the secure service using the metadata.

Figure 2A:
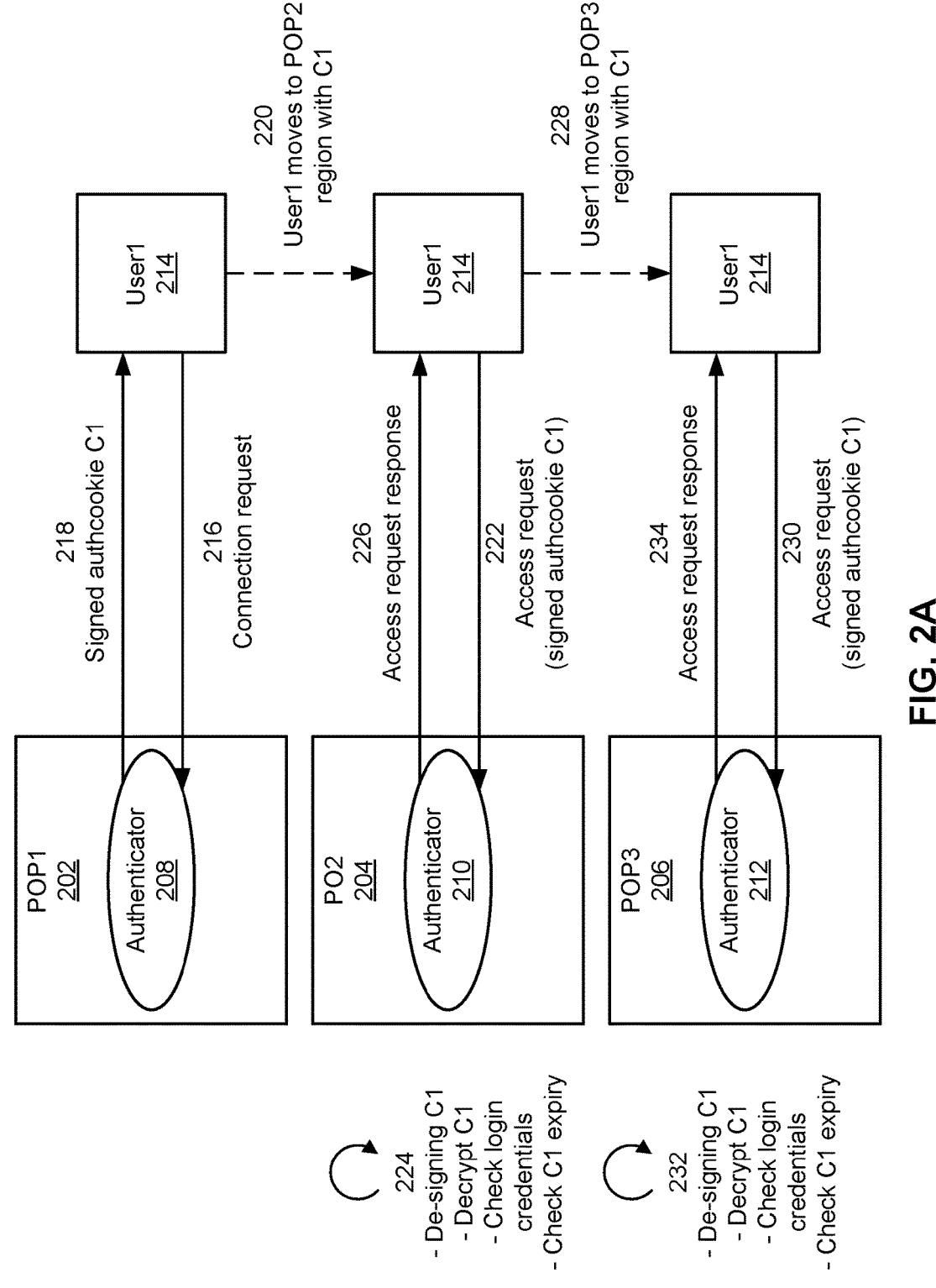
FIGS. 2A-2D are diagrams of an examples associated with encoding an authentication cookie with metadata.

More particularly, as shown in FIG. 2A, and as indicated by reference number 200, some implementations may include multiple POP devices, including a first POP device 202, a second POP device 204, and a third POP device 206. Each POP device may in turn be associated with an authentication component. More particularly, the first POP device 202 may be associated with a first authenticator device 208, the second POP device 204 may be associated with a second authenticator device 210, and the third POP device 206 may be associated with a third authenticator device 212. A browser 214 (e.g., a device associated with a roaming user, shown in FIG. 2A as "User1") may establish connections with each POP, such as in response to SLA criteria becoming better for a remote POP than a home POP and/or in response to the user moving geographic locations, as described above in connection with FIG. 1A. In that regard, the browser 214 may, in turn, establish an authenticated session with each POP.

For example, as indicated by reference number 216, the browser 214 may transmit a connection request to the first POP device 202, which may include information authenticating the roaming user (e.g., User1), such as login credentials (e.g., a username and/or password). Put another way, the first POP device 202 and/or the first authenticator device 208 may receive, from the browser 214, a connection request to connect to a secure service that includes login credentials associated with the user. The first authenticator device 208 may authenticate the user as an authorized user of a secure service (e.g., by comparing the login credentials to a database of authorized users, or the like). Put another way, the first authenticator device 208 may determine whether the user is an authorized device to connect to the secure service based on the login credentials. In implementations in which the user is authenticated, the first authenticator device 208 may generate an authentication cookie (shown in FIG. 2A as "authcookie C1"), and/or may transmit the authentication cookie to the browser 214, as indicated by reference number 218.

In some implementations, the authentication cookie (e.g., C1) may be encoded with metadata associated with the user, such as user attributes, authorized groups associated with the user, and/or similar information. Put another way, the first authenticator device 208 may generate the authentication cookie (e.g., C1) for the browser 214 that encodes metadata information associated with the user, such as an indication of the user attributes of the user. In some implementations, the metadata information (e.g., the user attributes and/or other information) may be stored in a compressed and/or hashed format, such as for a purpose of increasing security and/or ensuring that a size of the authentication cookie does not excess a maximum permitted size.

Additionally, or alternatively, the first authenticator device 208 may encrypt the authentication cookie, such as by using a symmetric key. In such implementations, the symmetric key may be maintained by a cloud-based key management service, and thus the first authenticator device 208 may retrieve the symmetric key from the cloud-based key management service for a purpose of encrypting the authentication cookie. For example, a symmetric key may be generated centrally (e.g., by a secure service controller or a similar component, as described in more detail below) and/or may be stored in a secure location, such as in an Amazon Web Services (AWS) secrets manager and/or a similar location associated with an AWS key management service (KMS). In some implementations, AWS KMS or a similar key management service may use hardware security modules (HSM) to protect and validate keys under the Federal Information Processing Standard (FIPS) 140-2 cryptographic module validation program.

In some implementations, any symmetric keys retrieved from a cloud-based key management service (e.g., AWS KMS) may not be stored locally at an authenticator device and/or a POP device. For example, the authenticator device may fetch a symmetric key from the cloud-based key management service, use the symmetric key to encrypt or decrypt an authentication cookie, and then destroy the symmetric key. In some implementations, symmetric keys may be tenant-wide (e.g., a different symmetric key may be used for each tenant of a secure service), while, in some other implementations, a same symmetric key may be used for multiple (e.g., all) tenants of a secure service. Moreover, in implementations employing a cloud-based key management service (e.g., AWS secrets manager), an authentication microservice (e.g., an authenticator device) at each POP may be configured to fetch the symmetric key from the cloud-based key management service and/or use the symmetric key locally for encryption of the authentication cookie.

Additionally, or alternatively, the first authenticator device 208 may sign the authentication cookie using a private key. For example, the POP devices 202, 204, 206 may be associated with a root CA capable of issuing certificates and/or private keys for signing authentication cookies, and thus the first authenticator device 208 may sign the authentication cookie using a private key issued by the root CA. In some implementations, each POP device and/or authenticator device may be associated with an intermediate CA that is capable of retrieving private keys from the root CA, signing authentication cookies using the private keys, and/or de-signing authentication cookies using the private keys, which is described in more detail below in connection with FIG. 2B. In such implementations, prior to signing the authentication cookie with the private key, an intermediate CA associated with the first authenticator device 208 may retrieve the private key from the root CA.

In some implementations, the authentication cookie may be encoded with additional information (e.g., metadata) to be used by one or more other POP devices and/or one or more other authenticator devices. For example, in some implementations, the first authenticator device 208 may encode the authentication cookie with expiration information indicating an expiration time associated with the authentication cookie. Put another way, a cookie expiry may be stored with the authentication cookie (e.g., encoded as metadata), and the cookie expiry may indicate a timestamp when the authentication cookie expires in an epoch time. In such implementations, a remote POP device may be capable of identifying whether an authentication cookie issued by another POP device has expired. For example, when a remote POP extracts the authentication cookie from the browser 214 and/or extracts the metadata from the authentication cookie (which is described in more detail below in connection with reference numbers 224 and 232), the cookie expiry (e.g., timestamp) may be present as part of the metadata. In that regard, the remote POP device may determine if the authentication cookie is expired and, if so, prompt the user for reauthentication (e.g., entering of the user's login credentials).

As indicated by reference number 220, the user may thereafter switch POPs with the authentication cookie (e.g., C1) stored in the user's browser 214. For example, the user may move to a region including the second POP device 204 with the signed and/or encrypted authentication cookie (e.g., C1) including the metadata (e.g., user attributes) encoded therein. In that regard, when the user attempts to access the secure service, such as by transmitting (e.g., via the browser 214) an access request with C1 appended thereto (as indicated by reference number 222), the second POP device 204 may be capable of authenticating the user by extracting the metadata from the authentication cookie.

More particularly, as indicated by reference number 222, the second authenticator device 210 may receive, from the browser 214, an access request to access the secure service, with the access request being marked with the authentication cookie (e.g., C1) that includes the metadata (e.g., user attributes, among other information). As indicated by reference number 224, the second authenticator device 210 may determine that the user is an authorized user to access the secure service, such as by extracting the user attributes from the authentication cookie (e.g., C1) and/or by comparing the user attributes to a list of approved users.

In that regard, in some implementations, determining that that the user is an authorized user may include de-signing, by the authenticator device, the authentication cookie using a private key issued by a root CA. For example, the second authenticator device 210 may be associated with an intermediate CA in a similar manner as described above in connection with the first authenticator device 208, and thus the intermediate CA of the second authenticator device 210 may receive the private key from the root CA and use the private key to de-sign the authentication cookie (e.g., C1). Additionally, or alternatively, determining that the user is an authorized user may include decrypting the authentication cookie using a symmetric key, such as a symmetric key retrieved from a cloud-based key management service (e.g., AWS KMS) by the second authenticator device 210. Moreover, in aspects in which the authentication cookie is encoded with expiration information indicating an expiration time associated with the authentication cookie, the second authenticator device 210 may determine that that the user is an authorized user based on the expiration information (e.g., based on whether or not the authentication cookie has expired).

As shown by reference number 226, based on a determination as to whether the user is an authorized user, the second authenticator device 210 and/or the second POP device 204 may respond to the access request. For example, in implementations in which the extracted user attributes indicate that the user is authorized to access the secure service and/or in which the expiration information indicates that the authentication cookie (e.g., C1) has not expired, the second authenticator device 210 and/or the second POP device 204 may respond to the access request by fulfilling a request received from the browser 214. On the other hand, in implementations in which the extracted user attributes indicate that the user is not authorized to access the secure service and/or in which the expiration information indicates that the authentication cookie (e.g., C1) has expired, the second authenticator device 210 and/or the second POP device 204 may respond to the access request by denying access to the secure service and/or requesting additional information (e.g., login credentials) from the user in order to establish a new authenticated session, among other examples.

In some implementations, substantially similar operations as described above in connection with reference numbers 220-226 may be performed at each successive POP at which the user attempts to connect to the secure service via the browser 214. For example, as shown by reference number 228, the user may thereafter switch POPs with the authentication cookie (e.g., C1) stored in the user's browser 214, such as by moving to a region including the third POP device 206, which may be substantially similar to the operations described above in connection with reference number 220. As indicated by reference number 230, the third authenticator device 212 may receive, from the browser 214, an access request for the secure service, with the access request being marked with the authentication cookie (e.g., C1) that includes the metadata (e.g., user attributes, among other information), which may be substantially similar to the operations described above in connection with reference number 222.

As indicated by reference number 232, the third authenticator device 212 may determine whether the user is an authorized user to access the secure service, such as by de-signing the authentication cookie (e.g., C1), decrypting the authentication cookie, extracting the user attributes from the authentication cookie, comparing the user attributes to a list of approved users, and/or identifying whether the authentication cookie is expired, which may be substantially similar to the operations described above in connection with reference number 224. Moreover, as indicated by reference number 234, based on a determination as to whether the user is an authorized user, the third authenticator device 212 and/or the third POP device 206 may respond to the access request, which may be substantially similar to the operations described above in connection with reference number 234. In that regard, the user may be capable of switching between POPs without requiring reestablishment of an authenticated session with each switch and/or without requiring high network overhead to verify that the user is an authorized user of the secure service.

Figure 2B:
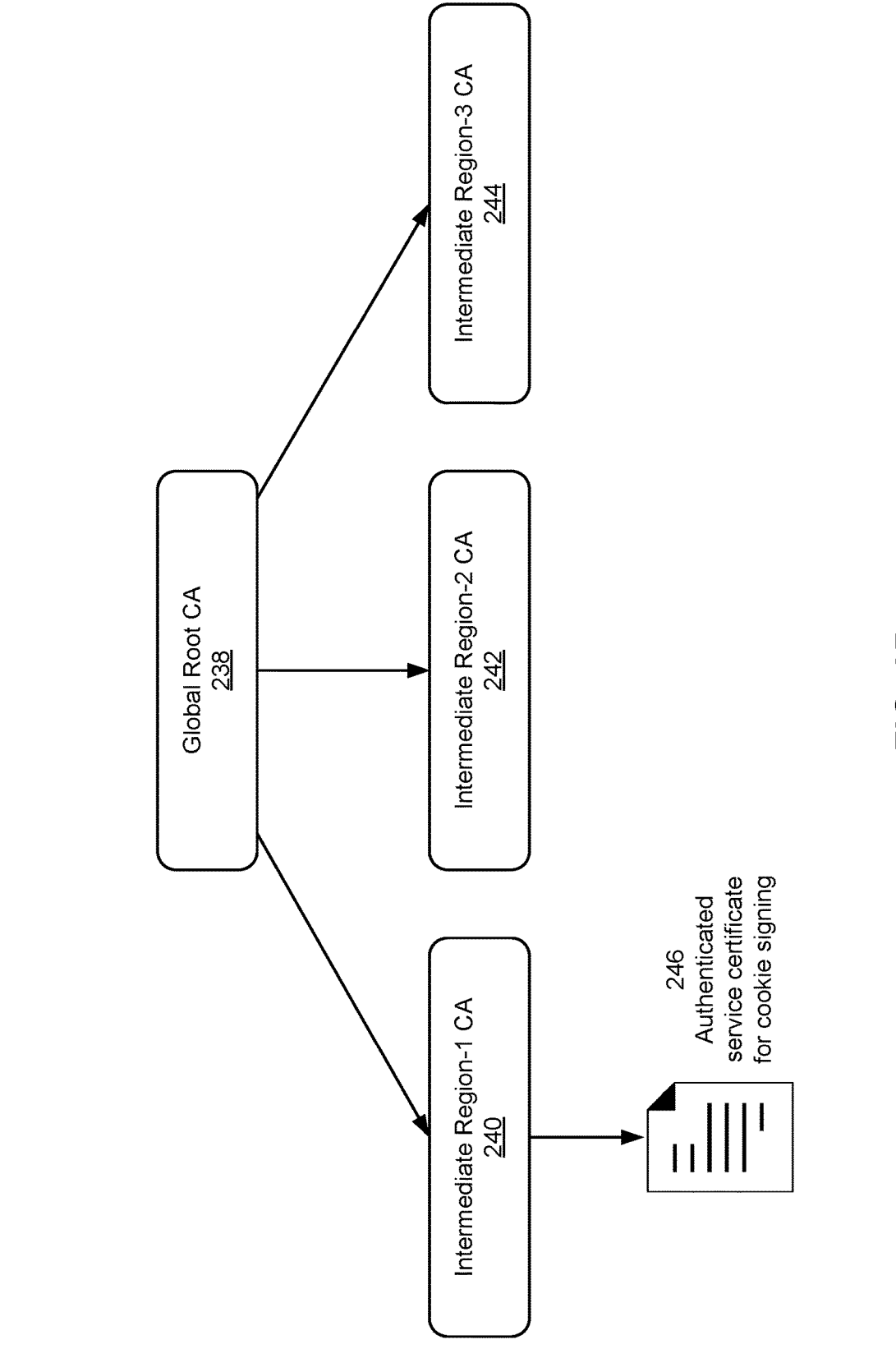

As described above in connection with FIG. 2A, in some implementations an authentication cookie (e.g., C1) may be signed or de-signed using a private key issued by a root CA. For example, as shown in FIG. 2B, and as indicated by reference number 236, a certificate service may include a global root CA device 238 (sometimes referred to simply as root CA herein for ease of description), which is in communication with multiple intermediate CA devices, shown in FIG. 2B as an intermediate region-1 CA device 240, an intermediate region-2 CA device 242, and an intermediate region-3 CA device 244. In some implementations, each intermediate CA device may be located at and/or associated with a POP device. For example, the intermediate region-1 CA device 240 may be located at and/or associated with the first POP device 202 and/or the first authenticator device 208, the intermediate region-2 CA device 242 may be located at and/or associated with the second POP device 204 and/or the second authenticator device 210, and/or the intermediate region-3 CA device 244 may be located at and/or associated with the third POP device 206 and/or the third authenticator device 212. In such implementations, each POP device (e.g., an authentication microservice and/or authenticator device at each POP device) may manage intermediate CA certificates signed by the global root CA device 238. For example, a root certificate may be fetched by an authentication microservice (e.g., an authenticator device) at each POP device to be used for signing the authentication cookie that is allocated to the browser 214 during authorization workflow and/or that is set in the browser 214's browser, as indicated by reference number 246.

Figure 2C:
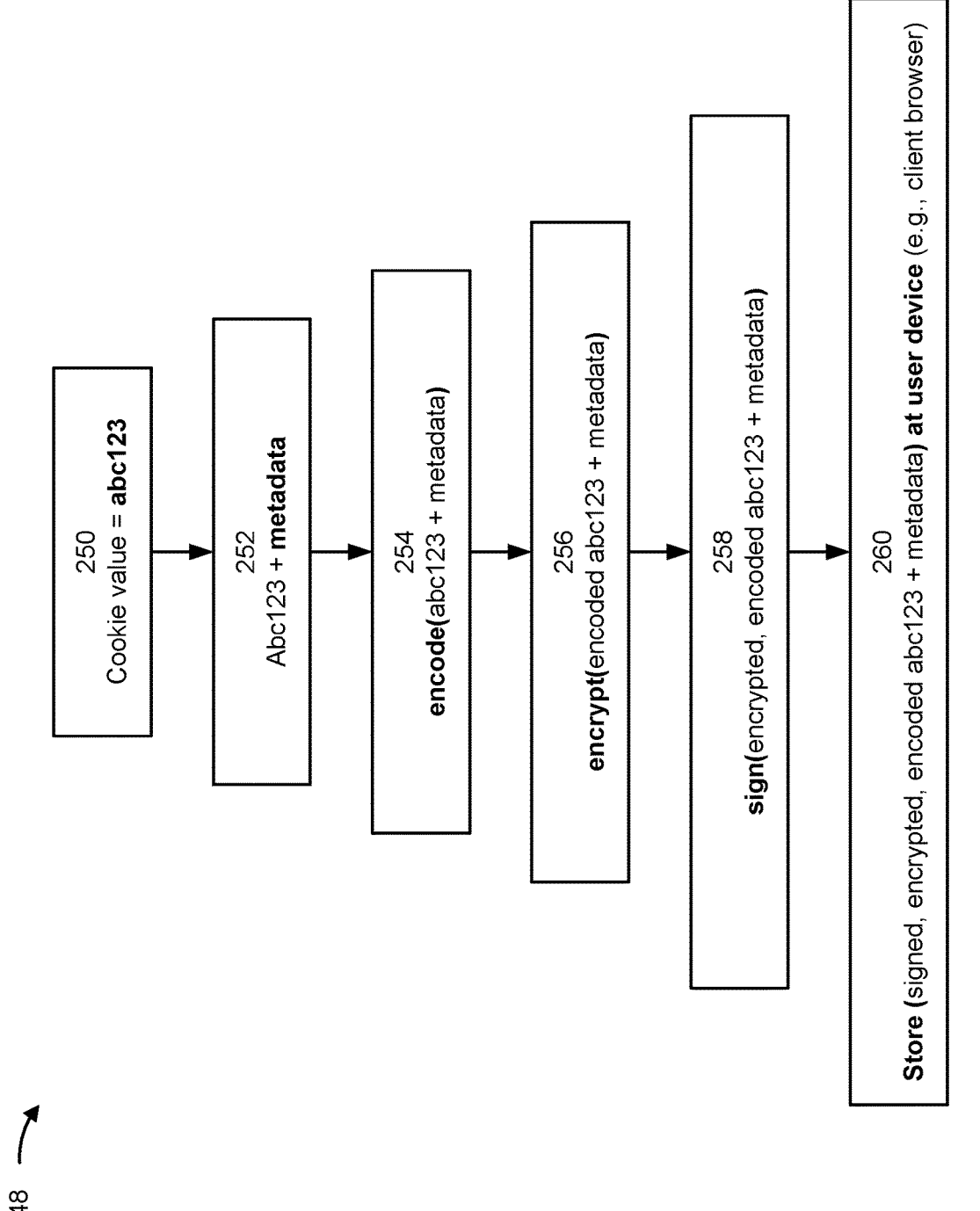

FIG. 2C shows an example 248 associated with steps that may be performed by an authenticator device to encode, encrypt, and sign an authentication cookie, such as the authentication cookie C1 described above in connection with FIG. 2A. As indicated by reference number 250, upon determining that a user is an authorized user to access a secure service, an authenticator device may generate data (e.g., a cookie value) associated with an authentication cookie, such as "abc123" in the example shown in FIG. 2C. As indicated by reference number 252, the authenticator device may append metadata to the cookie value. For example, the authenticator device may append metadata that includes user attributes (e.g., a username, a user's role, groups associated with the user, and/or similar information), an organization ID (e.g., an indication of an organization associated with the secure service for which the user is permitted access), one or more group IDs (e.g., an indication of one or more groups within an organization associated with the secure service for which the user is permitted access), expiration information, and/or other metadata.

As indicated by reference number 254, the authenticator device may encode the cookie value (e.g., abc123) and the metadata, such as by using an encoding algorithm. For example, in some implementations, the authenticator device may encode the cookie value (e.g., abc123) and the metadata using a base64 encoding scheme. As indicated by reference number 256, the authenticator device may encrypt the encoded cookie value and metadata, such as by using a symmetric key retrieved from a cloud-based key management service (e.g., AWS KMS), as described above. Additionally, or alternatively, as indicated by reference number 258, the authenticator device may sign the encrypted authentication cookie with a private key, such as by signing the authentication cookie using a certificate issued by a global root CA device, as described above. As indicated by reference number 260, the authenticator device may store the encrypted and signed authentication cookie at a user device, such as within a client browser of the user device.

Figure 2D:
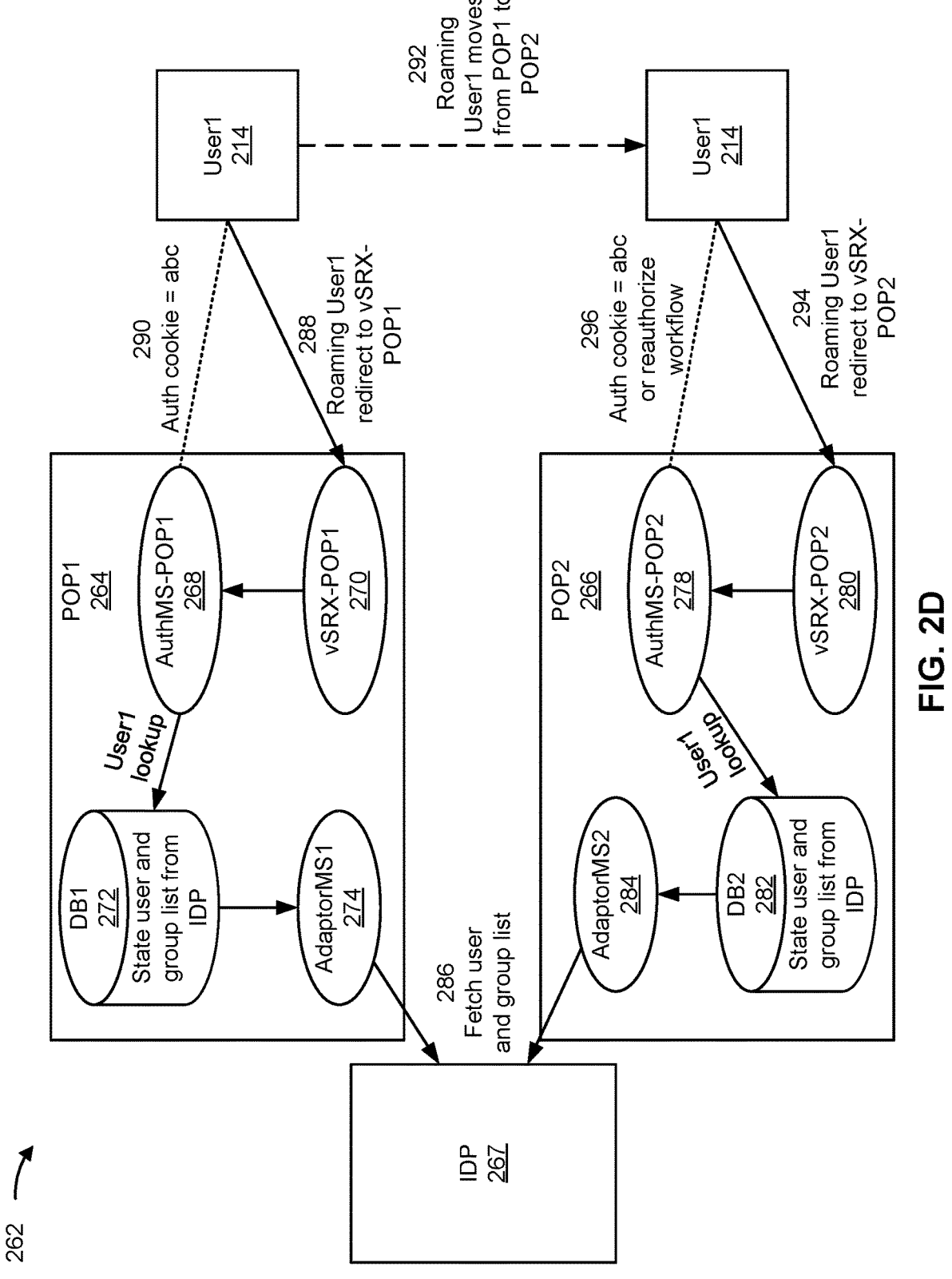

In some implementations, one or more POP devices may be associated with an IDP device, such as in implementations in which a secure service is associated with a security assertion markup language (SAML) IDP. In such cases, adaptors associated with each POP device may be used to periodically fetch user and/or group information from the IDP device, such as for a purpose of handling a user group change while the user is moving from a first POP to a second POP, a user IDP sign-out event while the user is moving from a first POP to a second POP, and/or a user IDP delete event while the user is moving from a first POP to a second POP. For example, as shown in FIG. 2D, and as indicated by reference number 262, in some implementations multiple POP devices (shown in FIG. 2D as a first POP device 264 and a second POP device 266) may be associated with an IDP device 267, which may be a device capable of providing authorized user information to the POP devices, such as information indicating groups within an organization and authorized users to access information associated with each group. In such implementations, the POP devices 264, 266 and/or the components thereof may be configured to periodically fetch the authorized user information, such as every five minutes or another configurable time interval.

More particularly, the first POP device 264 may be associated with various devices and/or components, such as a first authentication microservice device 268 (shown in FIG. 2D as "AuthMS-POP1," which may be substantially similar to the authenticator devices 202, 204, 206 and/or the authentication microservice devices 156, 164), a first virtual firewall device 270 (shown in FIG. 2D as "sVRX-POP1," which may be substantially similar to the virtual firewall devices 158, 166), a first IDP database 272 (shown in FIG. 2D as "DB1"), and/or a first adaptor microservice device 274 (shown in FIG. 2D as "AdaptorMS1"). Similarly, the second POP device 266 may be associated with similar devices and/or components, such as a second authentication microservice device 278 (shown in FIG. 2D as "AuthMS-POP2"), a second virtual firewall device 280 (shown in FIG. 2D as "sVRX-POP2"), a second IDP database 282 (shown in FIG. 2D as "DB2"), and/or a second adaptor microservice device 284 (shown in FIG. 2D as "AdaptorMS2").

As indicated by reference number 286, the adaptor microservice device 274, 284 at each POP device 264, 266 may be configured to periodically fetch authorized user information (e.g., a user and group list) from the IDP device 267 at a configured periodicity (e.g., every five minutes or a different configured time period). The adaptor microservice device 274, 284 may store the authorized user information (e.g., a user and group list) locally at a corresponding POP device 264, 266 (e.g., within a corresponding IDP database 272, 282 at each POP device 264, 266), such as for a purpose of authenticating a user (e.g., determining whether a user belongs to a certain group, has been logged out of a certain group, and/or similar determinations) during establishment of an authenticated session. In this way, if a user is logged out of the IDP during a POP switch, the user will not be part of the authorized user information fetched from the IDP device 267 by the adaptor microservice devices 274, 284 and/or stored locally at each POP in the corresponding IDP database 272, 282, and thereby the user may be prompted to reestablish an authenticated session, among other examples.

More particularly, as indicated by reference number 288, when the browser 214 attempts a connection to a secure service via the first POP device 264, the browser 214 may be redirected to the first virtual firewall device 270, such as via a browser PAC file. The user, via the browser 214, may be prompted to enter login credentials, such as a username and/or password. Using the login credentials, the first authentication microservice device 268 may determine whether the user is an authorized user of the secure service and/or the first authentication microservice device 268 may determine group information associated with the user, such as by performing a user lookup using the first IDP database 272. If the user is identified as an authorized user, the first authentication microservice 268 may issue the browser 214 an authentication cookie (e.g., may store an authentication cookie in the browser 214) that authorizes the user to access the secure service and/or any permitted groups associated with the secure service, such as an authentication cookie including data "abc," as indicated by reference number 290. As described above in connection with FIGS. 2A-2C, the authentication cookie may include metadata, such as user attributes, group IDs, expiration information, and/or similar information.

As indicated by reference number 292, the user may thereafter move from the first POP device 264 to the second POP device 266. Accordingly, as indicated by reference number 294, the browser 214 may be redirected to the second virtual firewall device 280, such as via a browser PAC file. In this example, a connection request sent by the browser 214 to the second POP device 266 (more particularly, to the second virtual firewall device 280) may include the authentication cookie abc, including the metadata encoded therewith. The second authentication microservice device 278 may determine whether the user is an authorized user of the secure service and/or is still logged in to the IDP, such as by referencing the second IDP database 282 (which may include an updated user and/or group list, fetched by the second adaptor microservice device 284 from the IDP device 267). If the user is identified as an authorized device (e.g., if user attributes and/or group IDs extracted from the authentication cookie match the information included in the second IDP database 282), the second authentication microservice device 278 may authorize access to the secure service and/or any associated groups using the previously issued authentication cookie (e.g., abc), as indicated by reference number 296. On the other hand, if the second authentication microservice device 278 determines that the browser 214 is not authorized to access the secure service (e.g., if the username and/or other user attributes are not part of the list stored in the second IDP database 282, and/or if the user has been logged out of and/or deleted from one or more groups during the POP switch), the authentication cookie (e.g., abc) may be deleted by the second authentication microservice device 278 and/or the user, via the browser 214, may be prompted to reauthenticate with the IDP (e.g., by entering login credentials, or the like).

Based on encoding an authentication cookie with metadata that includes user attributes of an authorized user of a secure service, among other information, the systems and techniques described herein may improve network performance and user experience. More particularly, based on encoding an authentication cookie with metadata that includes user attributes, among other information, a user may be authenticated at a remote POP device without requiring the user to reenter certain information and/or without requiring resource-intensive replication of an authentication cookie database across multiple POPs, resulting in improved user experience associated with connecting to a secure service, reduced latency and/or network overhead associated with authenticating a user of a secure service, and/or otherwise improved network operations associated with authenticating a user of a secure service.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3:
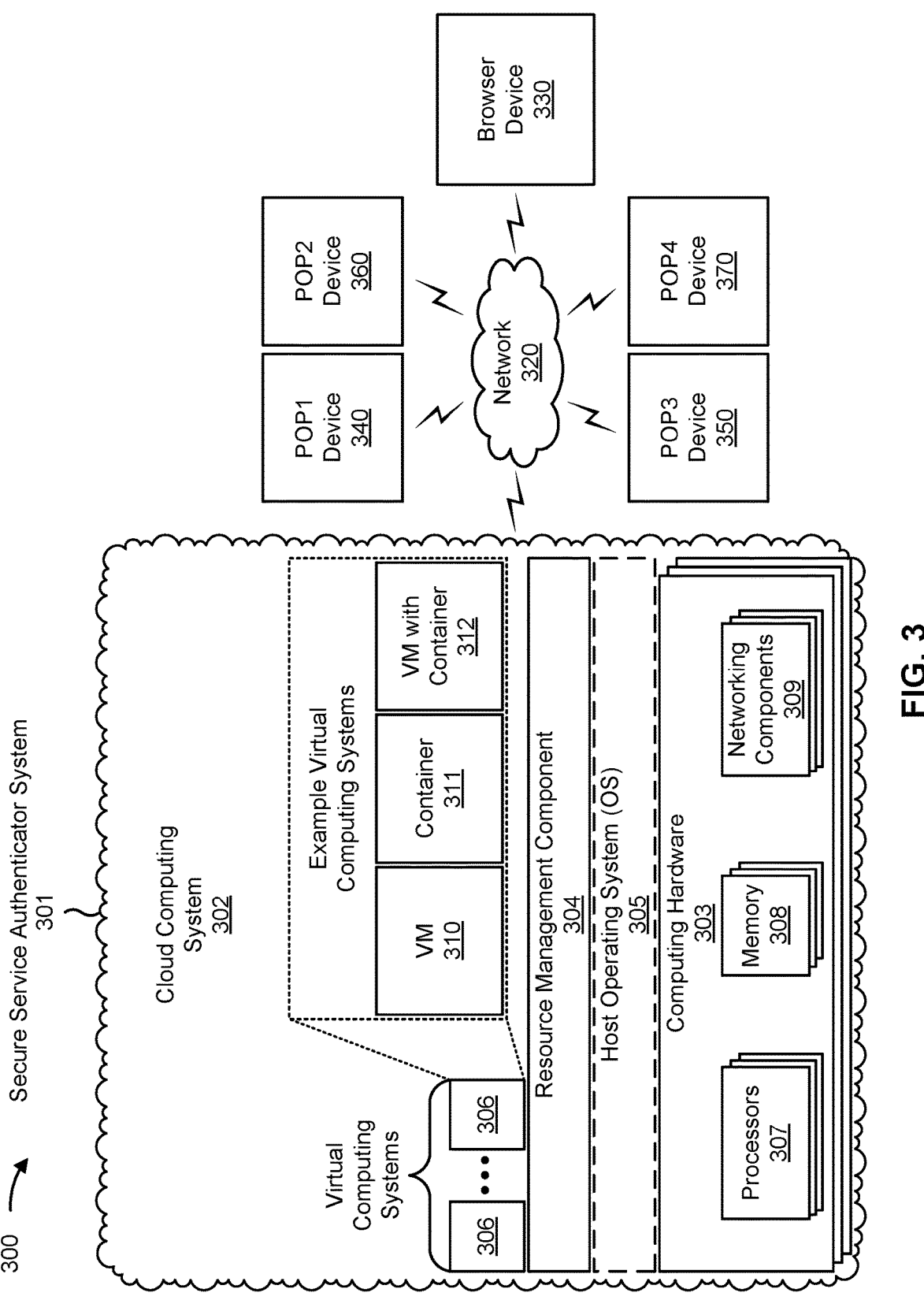
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a secure service authenticator system 301, which may include one or more elements of and/or may execute within a cloud computing system 302. The cloud computing system 302 may include one or more elements 303-312, as described in more detail below. As further shown in FIG. 3, environment 300 may include a network 320, a browser device 330, and/or POP devices 340, 350, 360, 370. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the secure service authenticator system 301 may include one or more elements 303-312 of the cloud computing system 302, may execute within the cloud computing system 302, and/or may be hosted within the cloud computing system 302, in some implementations, the secure service authenticator system 301 may not be cloud-based (e.g., may be implemented outside of a cloud computing system) or may be partially cloud-based. For example, the secure service authenticator system 301 may include one or more devices that are not part of the cloud computing system 302, such as device 400 of FIG. 4, which may include a standalone server or another type of computing device. The secure service authenticator system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The browser device 330 may include a personal computer, a laptop, a mobile device, a tablet, or a similar device that runs a browser that is capable of accessing a secure service via the network 320. In some implementations, the browser device 330 may include a browser (e.g., browser 214) that is capable of accessing the secure service and/or that is capable of managing cookies associated with authenticated sessions, such as the authentication cookie described above in connection with FIGS. 2A-2D. In this regard, in some implementations, the browser device 330 and/or the browser associated with the browser device 330 may be capable of appending the authentication cookie to requests transmitted by the browser, such as requests that are transmitted to one or more POP devices (e.g., POP devices 340, 350, 360, 370) and/or the secure service authenticator system 301.

The POP devices 340, 350, 360, 370 may include one or more devices associated with networking equipment, such as networking equipment that connect users (e.g., browser device 330) to a cloud service provider (e.g., cloud computing system 302). The POP devices 340, 350, 360, 370 may include servers, routers, switches, and/or other networking equipment that manage network traffic between end-users and cloud services. Additionally, or alternatively, the POP devices 340, 350, 360, 370 may include a firewall, intrusion detection systems, and/or other security applications. Each POP device 340, 350, 360, 370 may communicate with a central controller and/or central cloud infrastructure (e.g., the secure service authenticator system 301 and/or a component thereof), which may involve data transfer, security services processing, network traffic managements, and/or other cloud computing services. In some implementations, each POP device 340, 350, 360, 370 may include one or more devices associated with a microservice of the POP device, such as an authentication microservice device, an adaptor microservice device, or a similar device. In some implementations, one or more of the POP devices 340, 350, 360, 370 may correspond to one or more of the POP devices 202, 204, 206, 264, 266.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
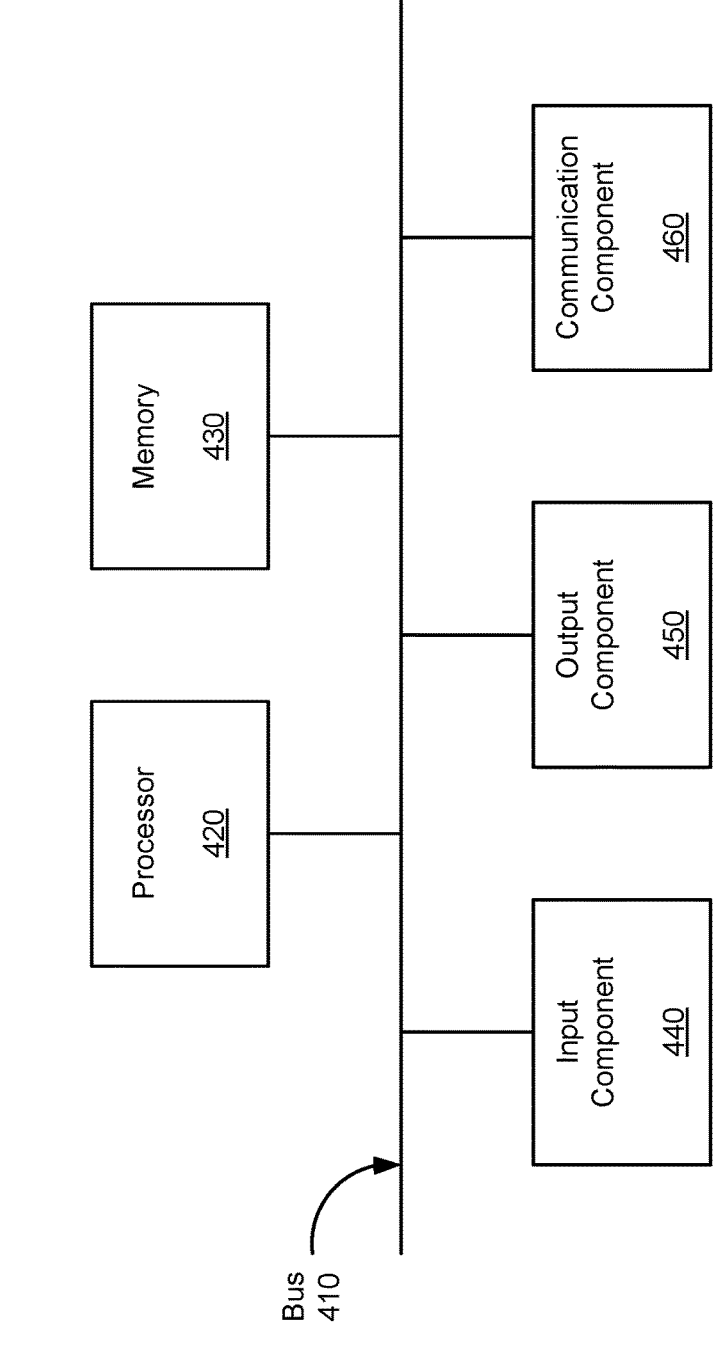
FIG. 4 is a diagram of example components of a device associated with encoding an authentication cookie with metadata.

FIG. 4 is a diagram of example components of a device 400 associated with encoding an authentication cookie with metadata. The device 400 may correspond to the POP devices 202, 204, 206, 264, 266, 340, 350, 360, 370; the authenticator devices 208, 210, 212; the browser 214; the browser device 330; the global root CA device 238; the intermediate CA devices 240, 242, 244; the authentication microservice devices 268, 278; the virtual firewall devices 270, 280; the adaptor microservice devices 274, 284; and/or the IDP device 276. In some implementations, the POP devices 202, 204, 206, 264, 266, 340, 350, 360, 370; the authenticator devices 208, 210, 212; the browser 214; the browser device 330; the global root CA device 238; the intermediate CA devices 240, 242, 244; the authentication microservice devices 268, 278; the virtual firewall devices 270, 280; the adaptor microservice devices 274, 284; and/or the IDP device 276 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit (CPU), a graphics processing unit (GPU), a microprocessor, a controller, a microcontroller, a digital signal processor (DSP), a field-programmable gate array (FGPA), an application-specific integrated circuit (ASIC), and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
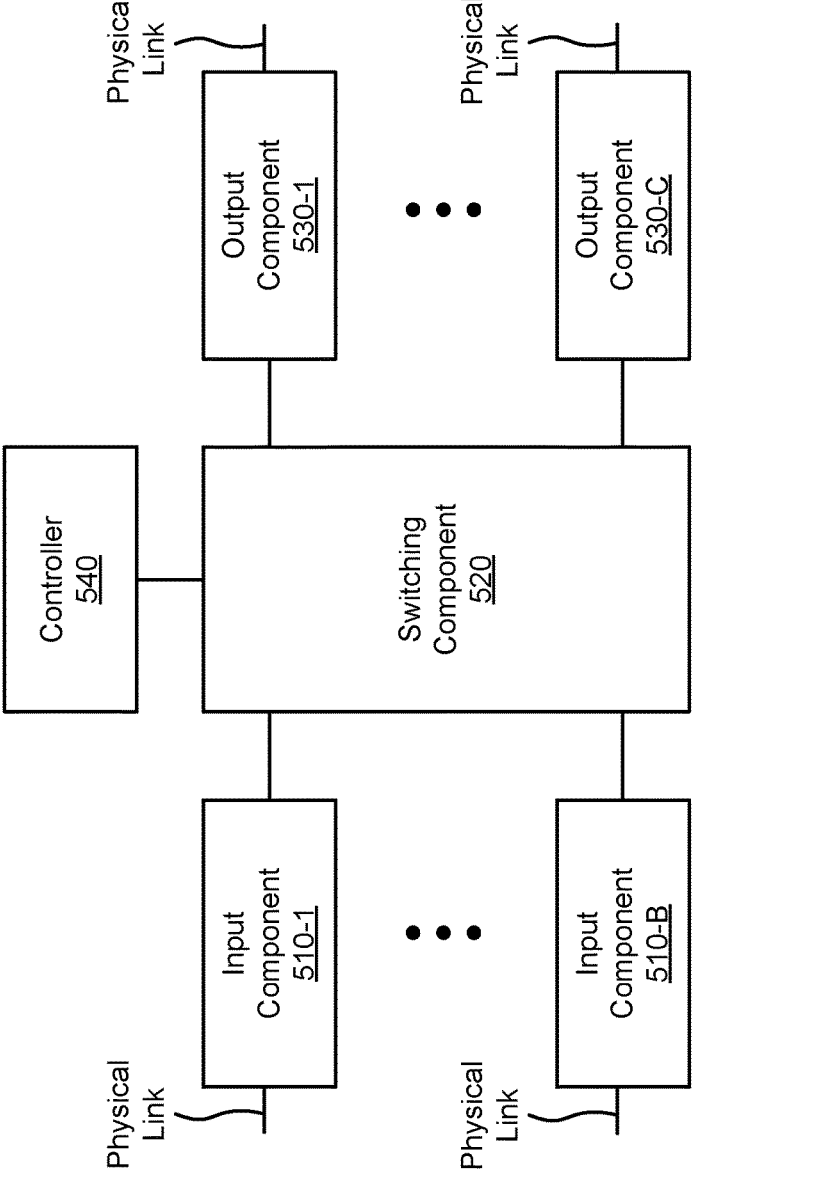
FIG. 5 is a diagram of example components of another device associated with encoding an authentication cookie with metadata.

FIG. 5 is a diagram of example components of a device 500 associated with encoding an authentication cookie with metadata. Device 500 may correspond to the POP devices 202, 204, 206, 264, 266, 340, 350, 360, 370. In some implementations, the POP devices 202, 204, 206, 264, 266, 340, 350, 360, 370 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flowchart of an example process 600 associated with encoding an authentication cookie with metadata. In some implementations, one or more process blocks of FIG. 6 are performed by an authenticator device (e.g., authenticator device 208, 210, 212; authentication microservice device 268, 278). In some implementations, one or more process blocks of FIG. 6 are performed by another device or a group of devices separate from or including the authenticator device, such as a device associated with the cloud computing system 302 and/or a POP device (e.g., POP devices 340, 350, 360, 370). Additionally, or alternatively, one or more process blocks of FIG. 6 may be performed by one or more components of device 400, such as processor 420, memory 430, input component 440, output component 450, and/or communication component 460, and/or one or more components of device 500, such input component 510, switching component 520, output component 530, and/or controller 540.

As shown in FIG. 6, process 600 may include receiving, at an authenticator device and from a browser, a request to connect to a secure service, wherein the request includes login credentials associated with a user of the browser (block 610). For example, the authenticator device may receive, at an authenticator device and from a browser, a request to connect to a secure service, wherein the request includes login credentials associated with a user of the browser, as described above.

As further shown in FIG. 6, process 600 may include determining that the user is an authorized user to access the secure service based on the login credentials (block 620). For example, the authenticator device may determine that the user is an authorized user to access the secure service based on the login credentials, as described above.

As further shown in FIG. 6, process 600 may include generating an authentication cookie for the browser, wherein the authentication cookie encodes metadata information associated with the user, and wherein the metadata information includes at least an indication of user attributes of the user (block 630). For example, the authenticator device may generate an authentication cookie for the user device, wherein the authentication cookie encodes metadata information associated with the user, and wherein the metadata information includes at least an indication of user attributes of the user, as described above.

As further shown in FIG. 6, process 600 may include transmitting, to the browser, the authentication cookie (block 640). For example, the authenticator device may transmit, to the browser, the authentication cookie, as described above.

Process 600 may include additional implementations, such as any single implementation or any combination of implementations described below and/or in connection with one or more other processes described elsewhere herein.

In a first implementation, generating the authentication cookie includes encrypting, by the authenticator device, the authentication cookie using a symmetric key.

In a second implementation, alone or in combination with the first implementation, process 600 includes retrieving, by the authenticator device and from a cloud-based key management service, the symmetric key.

In a third implementation, alone or in combination with one or more of the first and second implementations, generating the authentication cookie includes signing, by the authenticator device, the authentication cookie using a private key issued by a root certificate authority.

In a fourth implementation, alone or in combination with one or more of the first through third implementations, process 600 includes receiving, by an intermediate certificate authority associated with the authenticator device and from the root certificate authority, the private key.

In a fifth implementation, alone or in combination with one or more of the first through fourth implementations, process 600 includes receiving, by the authenticator device and from an identity provider device, authorized user information, wherein determining that the user is the authorized user to access the secure service is further based on the authorized user information.

In a sixth implementation, alone or in combination with one or more of the first through fifth implementations, generating the authentication cookie for the browser comprises encoding the authentication cookie with expiration information indicating an expiration time associated with the authentication cookie.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, at a first authenticator device and from a browser, a request to connect to a secure service,
  wherein the request includes login credentials associated with a user associated with the browser;
determining, by the first authenticator device, that the user is an authorized user to access the secure service based on the login credentials;
generating, by the first authenticator device, an authentication cookie for the browser,
  wherein the authentication cookie encodes metadata information associated with the user, and
  wherein the metadata information includes at least an indication of user attributes of the user;
signing, by the first authenticator device, the authentication cookie using a private key issued by a root certificate authority;
transmitting, by the first authenticator device and to the browser, the signed authentication cookie;

receiving, at a second authenticator device and from the browser, another request to access the secure service,
  wherein the other request to access the secure service is marked with the authentication cookie issued by the first authenticator device;
de-signing, by the second authenticator device, the signed authentication cookie using the private key issued by the root certificate authority; and
determining, by the second authenticator device, that the user is an authorized user to access the secure service based on the user attributes obtained from the de-signed authentication cookie.

2. The method of claim 1,
wherein generating the authentication cookie includes encrypting, by the first authenticator device, the authentication cookie using a symmetric key.

3. The method of claim 2, further comprising
retrieving, by the first authenticator device and from a cloud-based key management service, the symmetric key.

4. The method of claim 1, further comprising
receiving, by an intermediate certificate authority associated with the first authenticator device and from the root certificate authority, the private key.

5. The method of claim 1, further comprising
receiving, by the first authenticator device and from an identity provider device, authorized user information,
  wherein determining that the user is the authorized user to access the secure service is further based on the authorized user information.

6. The method of claim 1,
wherein generating the authentication cookie for the browser comprises encoding the authentication cookie with expiration information indicating an expiration time associated with the authentication cookie.

7. The method of claim 1,
wherein the first authenticator device is associated with a first point of presence (POP) device, the second authenticator device is associated with a second POP device, and the first POP device and the second POP device are associated with a common identity provider device.

8. A system, comprising:
a secure service controller device; and
multiple authenticator devices in communication with the secure service controller device, each of the multiple authenticator devices being associated with a corresponding point of presence (POP),
wherein a first authenticator device, of the multiple authenticator devices, is to:
  receive, from a browser, a connection request to connect to a secure service,
    wherein the connection request includes login credentials associated with a user associated with the browser;
  determine that the user is an authorized user to connect to the secure service based on the login credentials;
  generate an authentication cookie for the browser,
    wherein the authentication cookie encodes metadata information associated with the user, and
    wherein the metadata information includes at least an indication of user attributes of the user; and
  sign the authentication cookie using a private key issued by a root certificate authority;
  transmit, to the browser, the signed authentication cookie, and
wherein a second authenticator device, of the multiple authenticator devices, is to:

receive, from the browser, an access request to access the secure service, wherein the access request is marked with the signed authentication cookie;

de-sign the signed authentication cookie using the private key issued by the root certificate authority;

determine that the user is an authorized user to access the secure service based on the user attributes obtained from the de-signed authentication cookie; and respond to the access request based on determining that the user is the authorized user to access the secure service.

9. The system of claim 8, wherein the first authenticator device, to generate the authentication cookie for the browser, is to encrypt the authentication cookie using a symmetric key, and wherein the second authenticator device, to determine that the user is the authorized user to access the secure service, is to decrypt the authentication cookie using the symmetric key.

10. The system of claim 8, wherein the first authenticator device is further to receive, by a first intermediate certificate authority associated with the first authenticator device and from the root certificate authority, the private key; and wherein the second authenticator device is further to receive, by a second intermediate certificate authority associated with the second authenticator device and from the root certificate authority, the private key.

11. The system of claim 8, wherein the first authenticator device is further to receive, from an identity provider device, authorized user information, wherein the first authenticator device, to determine that the user is the authorized user to connect to the secure service, is to determine that the user is the authorized user to connect to the secure service based on the authorized user information, wherein the second authenticator device is further to receive, from the identity provider device, the authorized user information, and wherein the second authenticator device, to determine that the user is the authorized user to access the secure service, is to determine that the user is the authorized user to access the secure service based on the authorized user information.

12. The system of claim 8, wherein the first authenticator device, to generate the authentication cookie for the browser, is to encode the authentication cookie with expiration information indicating an expiration time associated with the authentication cookie, and wherein the second authenticator device, to determine that the user is the authorized user to access the secure service, is to determine that the user is the authorized user to access the secure service based on the expiration information.

13. The system of claim 8, wherein the first authenticator device is associated with a first POP device, the second authenticator device is associated with a second POP device, and the first POP device and the second POP device are associated with a common identity provider device.

14. An authenticator device, comprising:

one or more memories; and one or more processors, coupled to the one or more memories, to:

receive, at the authenticator device and from a browser, a request to connect to a secure service, wherein the request includes login credentials associated with a user associated with the browser;

determine that the user is an authorized user to access the secure service based on the login credentials;

generate an authentication cookie for the browser, wherein the authentication cookie encodes metadata information associated with the user, and wherein the metadata information includes at least an indication of user attributes of the user;

sign the authentication cookie using a private key issued by a root certificate authority;

transmit, to the browser, the signed authentication cookie;

receive, at the authenticator device and from the browser, another request to access the secure service, wherein the other request to access the secure service corresponds to another user and is marked with another authentication cookie issued by another authenticator device;

de-signing another signed authentication cookie corresponding to the other authenticator device, using the private key issued by the root certificate authority; and determine that the other user is an authorized user to access the secure service based on the user attributes obtained from the de-signed authentication cookie.

15. The authenticator device of claim 14, wherein the one or more processors, to generate the authentication cookie, are to encrypt, by the authenticator device, the authentication cookie using a symmetric key.

16. The authenticator device of claim 15, wherein the one or more processors are further to:

retrieve, from a cloud-based key management service, the symmetric key.

17. The authenticator device of claim 14, wherein the one or more processors are further to:

receive, from the root certificate authority, the private key.

18. The authenticator device of claim 14, wherein the one or more processors are further to:

receive, from an identity provider device, authorized user information, wherein determining that the user is the authorized user to access the secure service is further based on the authorized user information.

19. The authenticator device of claim 14, wherein the one or more processors, to generate the authentication cookie for the browser, are to encode the authentication cookie with expiration information indicating an expiration time associated with the authentication cookie.

20. The authenticator device of claim 14, wherein the authenticator device is associated with a point of presence (POP) device.

* * * * *